Figure 1:
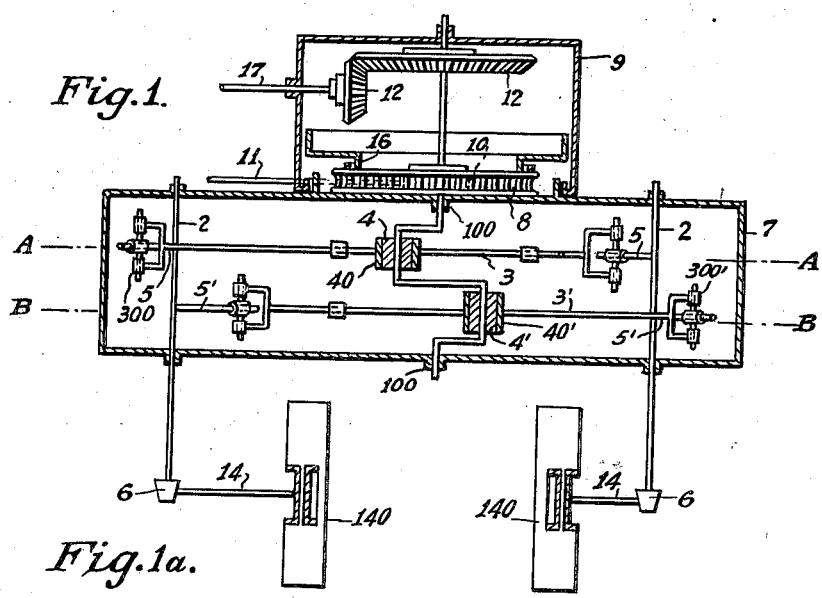

Aug. 31, 1937.  F. BLICHARSKI  2,091,845
PROPELLING DEVICE FOR WATERCRAFT AND AIRCRAFT
Filed Dec. 4, 1935  3 Sheets-Sheet 1

Inventor:
FRANZ BLICHARSKI
BY: Francis E. Boyce
ATTORNEY

Aug. 31, 1937.    F. BLICHARSKI    2,091,845
PROPELLING DEVICE FOR WATERCRAFT AND AIRCRAFT
Filed Dec. 4, 1935    3 Sheets-Sheet 2

Inventor.
FRANZ BLICHARSKI
BY: Francis E. Boyce
ATTORNEY

Aug. 31, 1937. F. BLICHARSKI 2,091,845
PROPELLING DEVICE FOR WATERCRAFT AND AIRCRAFT
Filed Dec. 4, 1935  3 Sheets-Sheet 3
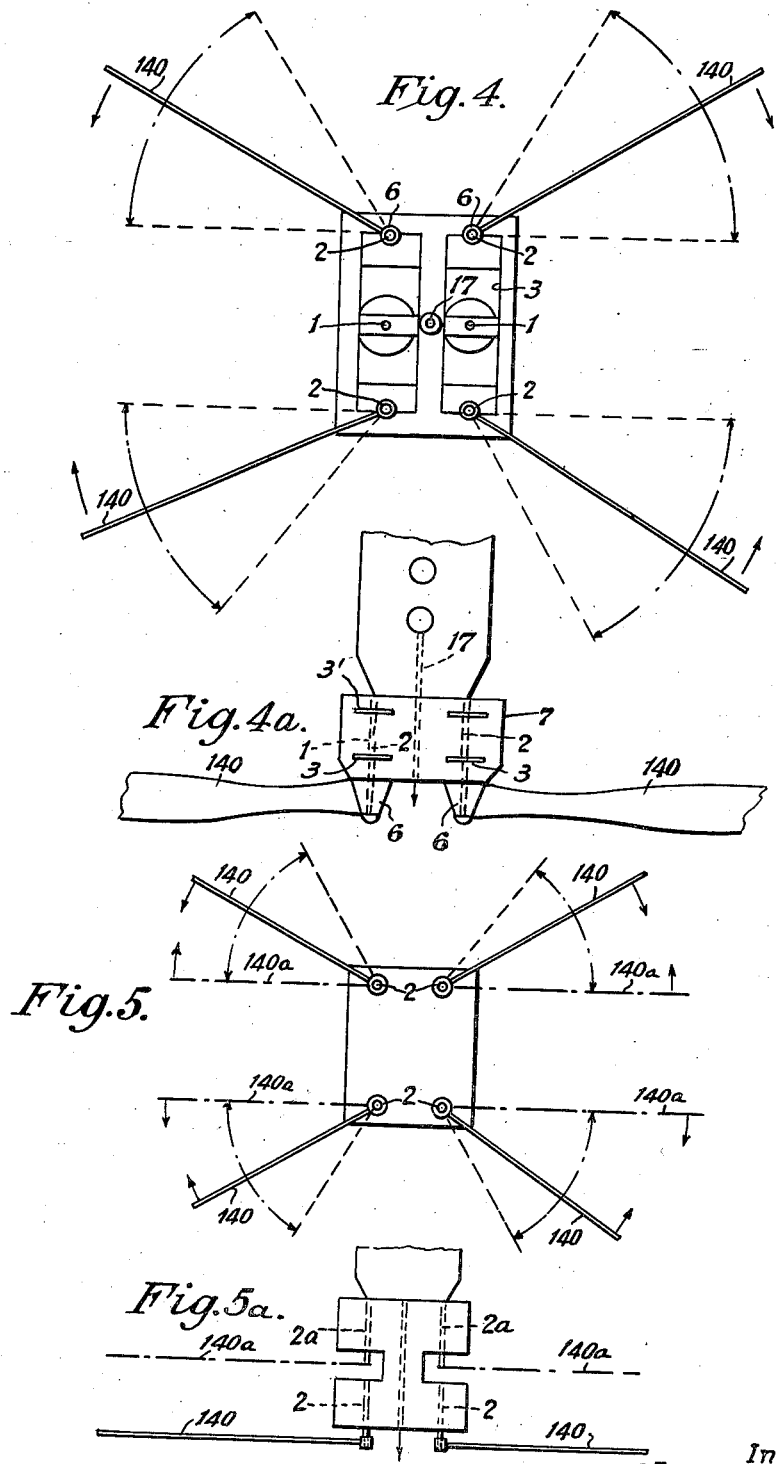

Patented Aug. 31, 1937

2,091,845

UNITED STATES PATENT OFFICE 2,091,845

PROPELLING DEVICE FOR WATERCRAFT AND AIRCRAFT

Franz Blicharski, Vienna, Austria

Application December 4, 1935, Serial No. 52,750
In Austria December 4, 1934

2 Claims. (Cl. 74—40)

This invention relates to propulsive devices for watercraft and aircraft and is concerned with devices of the kind comprising vibratory, reciprocatory or oscillatory fin-like or wing-like elements and driving mechanisms for operating them. Such propulsive devices are already known wherein a pair of oppositely moving fin-like or wing-like members are supported on arms projecting from parallel shafts which receive oscillatory motion by connection with a common slide frame, block, piston or the like reciprocating in the plane containing the axes of the two shafts, the slide frame, block or the like being oscillated symmetrically with respect to the centre plane of the shafts. In consequence of the use of a single sliding frame or block, the arrangement has the disadvantage that it produces one-sided or unbalanced mass oscillations and consequently vibrations which injuriously stress the material and the motor, especially at high speeds of oscillation. If, furthermore, the coupling of the parallel shafts to the straight running slide frame, block, piston or the like, takes place by means of connecting rods or links, there arises in consequence of the unsymmetrical effect of this crank driving member, a further injurious vibration and irregular stressing of the motor.

In order to overcome in a simple and reliable manner the defects above mentioned and to permit a substantially complete balancing of the moving masses and a working free from interruption even on the breaking of a part, according to the invention each parallel shaft is coupled in like manner to two such sliding blocks or the like, these latter being moved symmetrically in contrary directions by a common drive, and thus presenting two like sets of gears running symmetrically opposite to each other.

Also in order to reduce to a minimum the bearing pressure exerted by the parallel shafts so that the gear can be given particularly small dimensions and can work at a high efficiency, according to the invention, the two sliding frames are coupled with each of the two shafts without conventional connecting rods, for example by arms provided at the ends, which arms engage on sliding joints of lever arms located oppositely to each other, on the shafts, the sliding frames being driven for example by double cranks engaging in transverse slides.

If the irregular stressing of the driving motor caused by the shock-like action of the propulsive wings is to be avoided and an uninterrupted effect in the mean is to be attained, this can be particularly easily attained by the gear according to the invention by quarter or other phased displacement of the oscillations of the propulsive pairs of wings with respect to each other.

The drawings show diagrammatically various examples of construction and arrangement of the gear according to the invention, in Figs. 1 to 3a for water vehicles, and in Figs. 4 to 5a for aircraft.

Figure 1A:
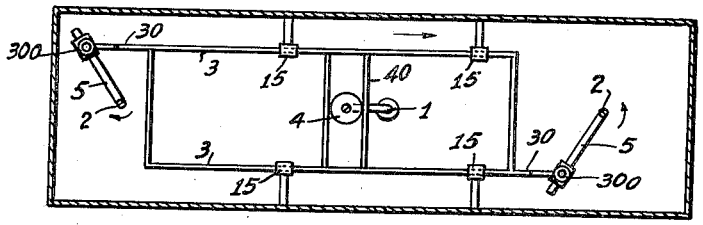
Figure 1B:
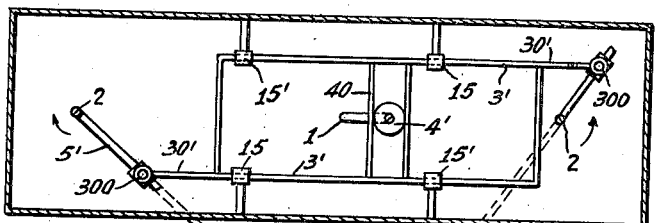
Figures 1C, 1D:
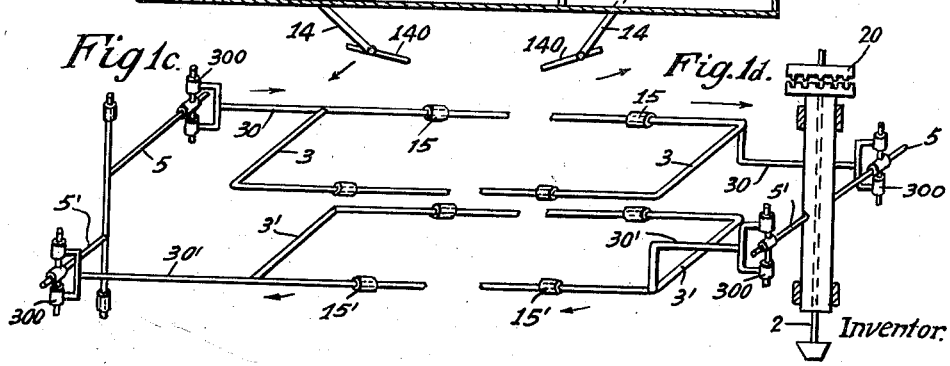
Figure 2:
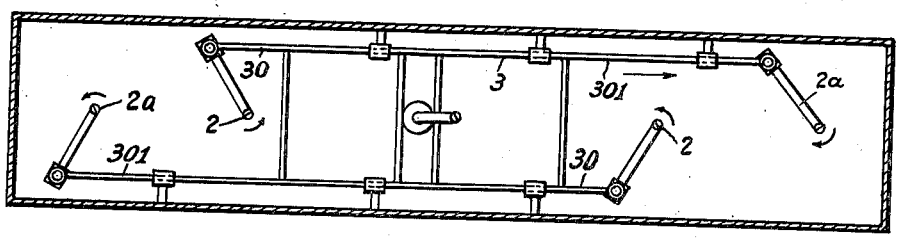
Figure 2A:
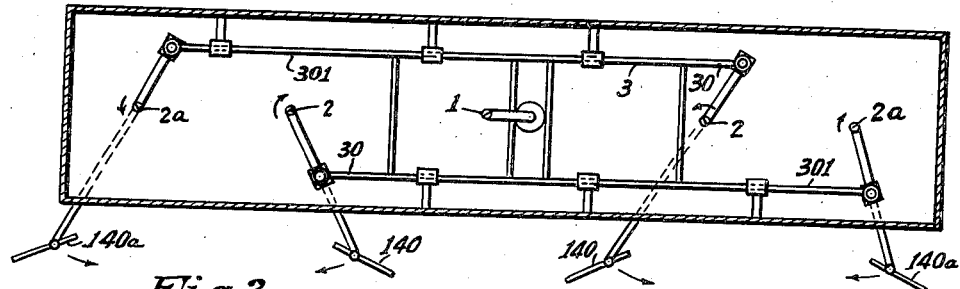
Figure 3:
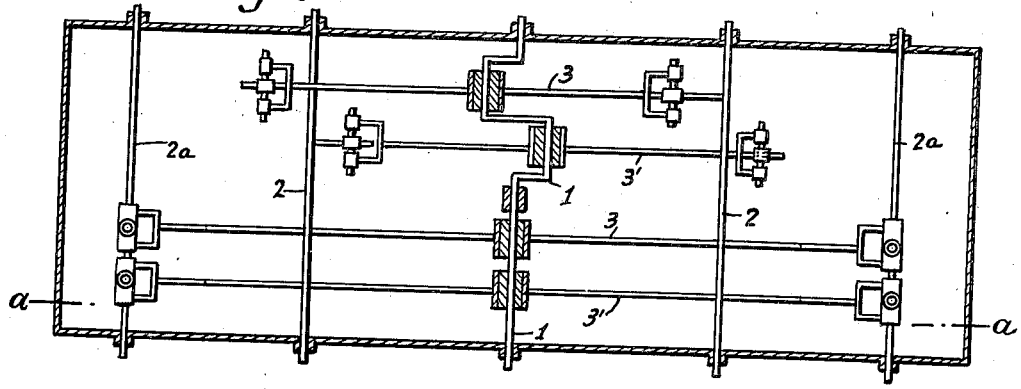
Figure 3A:
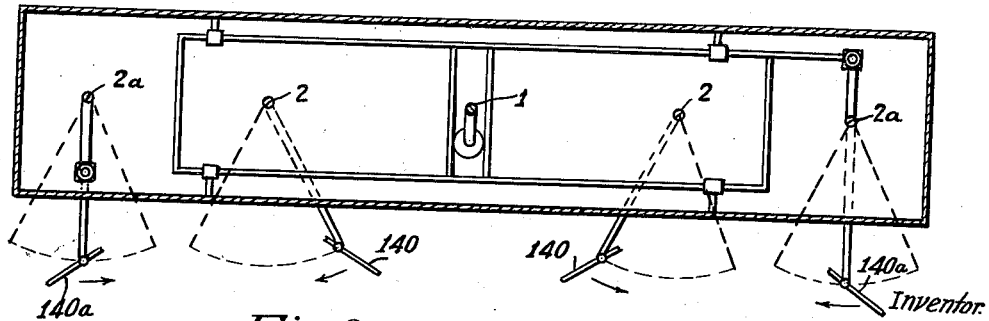

Fig. 1 shows the gear in elevation and partly in section, Figs. 1a and 1b are cross sections on the lines A—A, and B—B of Fig. 1, Fig. 1c is a perspective representation of the connection of the parallel shafts with the driving sliding frames in the central position, Fig. 1d a similar representation of another embodiment of this connection with adjustability of the shaft, whilst Fig. 2 shows an embodiment of the upper sliding frame with four parallel shafts, and Fig. 2a represents the lower sliding frame in plan. Fig. 3 is an elevation of the gear with four sliding frames, four parallel shafts, and a four-throw crank shaft. Fig. 3a is a section on the line a—a of Fig. 3. Fig. 4 shows in elevation a part of an aircraft with four propulsive wings, and Fig. 4a the same in plan. Fig. 5 is an elevation, and Fig. 5a a plan view of part of an aircraft with eight propulsive wings in which the oscillations of the front four are displaced a quarter phase with respect to those of the rear wings.

The main shaft 1 of the gear is carried in bearings 100 of the gear casing 7, and is made as a double cranked shaft with cranks displaced by 180° (Fig. 1). On each crank there is connected by means of a sliding connection an upper sliding frame 3 (Fig. 1a) and a lower sliding frame 3' (Fig. 1b), these always moving in the opposite direction on the revolution of the crank shaft. A sliding part 4 or 4' fitted on each shaft engages in a slide way 40 or 40' running transversely of the sliding frame 3 or 3', respectively, and these consequently carry out oscillating movements in harmony in sliding bearings 15 or 15' fitted on the gear casing 7. Each sliding frame carries at each end an arm 30 or 30' respectively. The arms 30, 30' of each sliding frame are located at diagonally opposite corners, and terminate in a sliding joint 300 in which engages the end of a lever arm 5 or 5'. The lever arms 5, 5' are connected with the shafts 2, of the propulsive wings, carried in the gear casing 7 or are integral with them and effect the angular oscillations of the shafts about their longitudinal axes. Connected with the shaft 2 located (according to the drawings) to the right of the main shaft 1 is the right-hand lever arm 5' (Fig. 1b)

actuated by the lower sliding frame 3', and diagonally opposite the right-hand lever arm 5 actuated by the upper sliding frame 3 (Fig. 1a). The lever arms 5, 5' impart to the shaft 2, in consequence of the diametrical attachment and the oppositely directed movement of the sliding carriages, angular oscillations always in the same direction, which varies each time with the direction of movement of the sliding frames.

The lower ends of the shafts 2 projecting from the gear case 7 (Fig. 1) are fitted with the bosses 6 of the supporting arms 14 of the propulsive fins or wings 140. The sliding frames 3, 3' driven by the main shaft 1 or directly by the driving machine, carry out harmonically opposed oscillating movements which by means of the lever arms 5, 5' connected with the arms 30 by sliding joints 300 are again transmitted to the shafts 2 of the propulsive wings as harmonic angular oscillations (Figs. 1c, 1d). The shafts 2 are in such manner positively coupled with each other by the gear so that, as already mentioned, they always carry out angular oscillations in opposite directions and are engaged by their lever arms at diametrically opposite places, whereby they form freely oscillating shafts in which the bearing pressures are minimized which is important for a continuous stressing and the attaining of the best efficiency.

The gear casing 7 carries on its cover a worm wheel 8 arranged coaxially to the main shaft 1 and which has a hollow cylindrical extension 16 projecting upwards from the top, this extending into a fixed immovable casing 9 and so effecting the rotatable bearing of the gear casing 7 in the casing 9. In the casing 9 there is also provided a shaft 11 carrying a worm 10 (Fig. 1) engaging in the worm wheel 8 and there is inserted between the motor shaft 17 and the main shaft 1 a gear 12 (e. g., a bevel wheel gear) which, as required, effects a transmission of the motion at the same time reducing the speed. By means of the worm wheel gear 8, 10 a rotation of the housing 7 and the gear about the main shaft in the housing 9 can be attained and thereby the direction of operation of the propulsive wings be altered. The worm shaft 11 can either be driven by hand or by servo-motor arrangement (not shown). The steering is thus always possible whether the motor drives the gear with the shafts or the drive is interrupted. Alternatively the whole driving gear (including the motor if desired) may be mounted in or on a rotatable cylindrical casing (not shown) whereupon steering may be effected by turning said casing one way or the other. According to another arrangement indicated in Fig. 1d each shaft 2 is enclosed within a tubular casing which drives it through a differential gear device 20 permitting the direction of operation of the propulsive fins or wings to be adjusted for steering purposes. In each of these cases, the drive can be so arranged that it can be raised more or less as required and can also be used in shallow water. Attention to and interchangeability of the propulsive wings is thus very easily possible.

In the case of all the gear parts in motion, there is attained a complete symmetry of movement with respect to the central plane of the shafts, and all the moving parts including the revolving main shaft 1, the sliding frames 3, 3' with the lever arms 5, 5', the shafts 2, and the propulsive wings 140 are in themselves and with respect to each other carefully counterbalanced in order to avoid vibrations. Consequently, in particular all gearing parts in pairs are made equal to each other and can be made from the same pattern and be used interchangeably.

Figs. 2 and 2a show by way of example the use of the gear for four propulsive wings of water vessels. In this case, the sliding frames 3, 3' are provided at the ends, in addition to the arms 30, 30', on the other diagonally opposite corners, with two other longer arms 301, 301', which are connected with supplementary shafts 2a in the manner described. By means of these four propulsive wings 140, 140a, a wide zone of additional water can be gripped and thus a good support and small slip be attained. In consequence of the particularly good support, the propulsive wings can be loaded with a greater mechanical output than in the case of revolving propelling surfaces, and the speeds of travelling attained by the water borne craft are considerably increased.

With the gear embodiments described, the action of the propulsive wings is an intermittent one and consequently the stressing of the driving motor is not uniform. With rapid oscillations, the interruptions of the drive of the propulsive wings and thus the uneven motor stressing do not act prejudicially. With a drive having propulsive wings working slowly all the time, it is, on the contrary, advisable to shorten the periods of interruption of the working on an average, in order to obtain a uniform stressing of the driving motor.

A particular advantage of the gear consists in that by very simple means, this requirement can be taken into consideration. In this case, at least two pairs, that is, four, propulsive wings are used in such manner that both pairs are driven by the same driving motor and the same gear but in different phase.

Fig. 3 shows an embodiment in which the main driving shaft 1 is made as a four-throw crank shaft, the plane of the two upper cranks being displaced 90° from the plane containing the two lower ones. The upper pair of sliding frames 3, 3' of the two inner shafts 2 and propulsive wings 140 are set in oscillation by the two upper cranks, and the lower pair of sliding frames 3, 3' with the two outer shafts 2a and propulsive wings 140a, by the two lower cranks, the oscillations of the pair of sliding frames being displaced with respect to each other by a quarter phase. If therefore the two inner propelling wings 140 are in the position of reversal, that is, in an inoperative condition (Fig. 3a), then the two outer propelling wings 140a are in their central position and thus in full operation. The two propelling wing pairs 140, 140a working in different phase can be differently grouped, the arrangement of the parallel shafts with their driving slide members and the like, corresponding thereto.

Figs. 4 and 4a show the use of the gear for propelling wings of aircraft. Two main crank shafts 1, with adjacently arranged pairs of sliding parts 3, 3', and fitted side by side or one over the other are directly driven by means of transmission wheels from the motor shaft 17. Forwardly from the gear casing 7 extend four shafts 2 each of which carries the boss 6 of a propelling wing 140. The four driving wings are fully counterbalanced with respect to each other and work to and from each other symmetrically with respect to the centre plane of the shafts (see arrows) and have great tractive effect, since each works in its own zone of air (shown by broken lines) and the driving wings do not mutually interfere with one another. This effect of the driving wings permits the aircraft to rise from the ground or to land without running along the ground. Furthermore, a hovering flight is possible in consequence of the action of the propelling wings as a purely lifting propeller. The aircraft can also be kept hovering without altering its position even without wind. In consequence of the great driving force of this gear, a slow flight is possible to an extent not hitherto attainable, as for example with cloudy weather, fogs or low visibility.

Figs. 5 and 5a show two such propelling wing systems (that is, four propelling wings in each) arranged one behind the other, which oscillate displaced by a quarter phase with respect to each other. By means of this method of working, it is also possible to run large propelling wings slowly with heavy motor outputs without the driving motor being stressed unevenly to any great extent and without the action of the propelling wings in the medium (in the air) being appreciably interrupted. (This grouping of the propelling wings is particularly suitable for ornithopters).

With the embodiments described, pairs of propelling wings or systems oscillating displaced by a quarter phase are described, but pairs of propelling wings or systems working displaced differently in phase can be used. A number of gear units with their propelling wings can also be used in other groupings, the method of grouping being in particular dependent upon the type of craft which is to be created whilst observing the said necessary principles.

I claim:
1. In a propelling gear for watercraft or aircraft, a constantly driven crankshaft, slidable members connected with said crank shaft for reciprocation thereby in opposite directions, pairs of propeller shafts mounted for rotation in parallel relation, and lever mechanism connecting each pair of propeller shafts with one of the slidable members at opposite ends thereof whereby the propeller shafts connected to opposite ends of each sliding member will be oscillated in opposite directions relatively to each other during reciprocation of the slidable members.

2. In a propelling gear for watercraft or aircraft, a constantly driven crankshaft, slidable frames each having a guideway in engagement with one of the cranks of the crankshaft whereby rotation of the crankshaft will effect reciprocation of the slidable frames each in a straight path, pairs of propeller shafts mounted for rotation in parallel relation, a lever arm secured to each of said propeller shafts, and connecting members carried by each of said frames at diagonally opposite corners thereof, each of said connecting members being slidably connected with one of said lever arms whereby the lever arms connected to the diagonally opposite corners of the slidable frames will be rocked in opposite directions during reciprocation of said frames thereby imparting to the corresponding propeller shafts oscillatory motion in opposite directions.

FRANZ BLICHARSKI.